May 5, 1964 V. R. POWELL 3,131,727
TUBULAR ARTICLE
Filed March 7, 1960 2 Sheets-Sheet 1

VERNON R. POWELL
INVENTOR

BY
William C. Babcock
ATTORNEY

May 5, 1964 V. R. POWELL 3,131,727
TUBULAR ARTICLE
Filed March 7, 1960 2 Sheets-Sheet 2

VERNON R. POWELL
INVENTOR
BY William C. Babcock
ATTORNEY ic Office 3,131,727
Patented May 5, 1964

3,131,727
TUBULAR ARTICLE
Vernon R. Powell, Long Beach, Calif., assignor to Eastwood Acceptance Corp., Los Angeles, Calif.
Filed Mar. 7, 1960, Ser. No. 13,238
4 Claims. (Cl. 138—173)

The present invention relates generally to the field of metal working, and more particularly to close tolerance tubing and articles of manufacture formed thereby. This application is a continuation-in-part of copending application Serial No. 512,061 entitled Method for Forming Close Tolerance Tubing and Articles Thereon, filed May 31, 1955, which issued as Patent No. 2,927,372 on March 8, 1960.

Since the filing date of said application Serial No. 512,061 certain improvements have been made in the method described and claimed therein whereby stock tubing is gripped and tensioned by forces exceeding the yield point of the material from which the tubing is fabricated, and when so gripped and tensioned, is subjected to the action of a rotating hard surface to permit the stock tubing to be transformed into close tolerance tubing having a desired wall thickness.

The invention disclosed in the present application is also directed to a method of transforming stock tubing to close tolerance tubing, but by means of which stock tubing is subjected to a first longitudinally directed force that does not stress the material forming the same above the yield point thereof. The material forming the stock tubing is thereafter subjected to a second radially directed force of sufficient magnitude to sink a hard surface therein a desired depth to compress the material, with the material forming the stock tubing being subsequently subjected to a third longitudinally directed force as the hard surface is concurrently rotated therearound and moved longitudinally relative thereto. The combined magnitude of the first and third forces is sufficiently great to cause permanent plastic deformation of the stock tubing to close tolerance tubing.

A major object of the present invention is to provide a number of articles of manufacture having new, novel and useful properties, which articles have not been available heretofore.

Another object of the invention is to provide thin-walled seamless tubing fabricated from steel and various chemical and heat-resistant alloys thereof, as well as from the exotic metals including, but not limited to, titanium and zirconium, which are inherently highly corrosion resistant in certain environments, with the seamless tubing so formed having a wall thickness, if desired, of less than that to which tubes of the same material can be drawn.

A further object of the invention is to provide new articles of manufacture such as high-pressure pipe, pressure vessels, and the like, that are fabricated by the use of a number of the above mentioned thin-walled tubing, which are formed in pressure-abutting contact to define a wall structure of desired thickness.

Yet another object of the invention is to supply a new tubular product, free from welding, that includes first and second tubular members which are held in concentrically spaced relationship by a resilient corrugated sheet disposed therebetween, with the second tubular member by plastic deformation thereof being caused to transversely contract and frictionally grip the corrugated member in a sandwiched position between said first and second tubular members.

A still further object of the invention is to furnish a tubular product of the character described that has the annulus-shaped space between the first and second members sealed at the ends thereof, which space is evacuated of air for heat insulation.

A still further object of the invention is to provide various-ply tube constructions in which either the outer or inner thin-walled tubing has improved heat or corrosion resistant properties over the balance of the thin-walled tubing in the product.

A further object of the invention is to provide seamless metallic blanks for use in the formation of seamless bellows, as well as seamless bellows formed by the process described herein.

Yet another object of the invention is to provide stressed architectural products, new insulated electrical-conducting sections, and structural members, the physical characteristics of which have been improved by being subjected to the process disclosed herein.

These and other objects and advantages of the present invention will become apparent from the following description thereof, and from the accompanying drawings illustrating the same in which.

Figure 2:
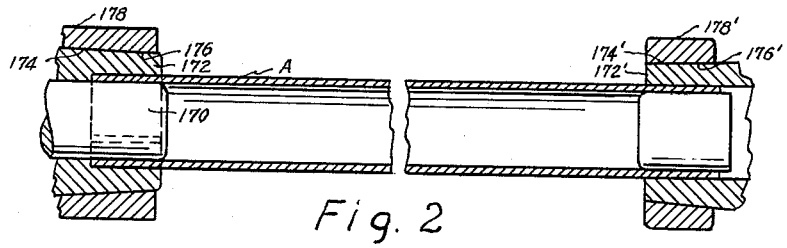
FIGURE 2 is a cross-sectional view of a length of metallic tubing gripped at the ends thereof for the longitudinal stressing thereof.
Figure 4:
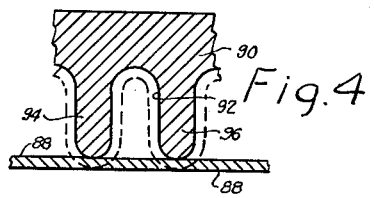
FIGURE 4 is a diagrammatic view of a wall section of the blank shown in FIGURE 3 prior to deformation thereof into a bellows-shaped configuration.

With further reference to the drawings, tension on tubing A can be achieved by using the method described in said application Serial No. 512,061, particularly as shown in FIGURE 4 thereof, which figure is reproduced as FIGURE 2 in the present application.

Figure 1:
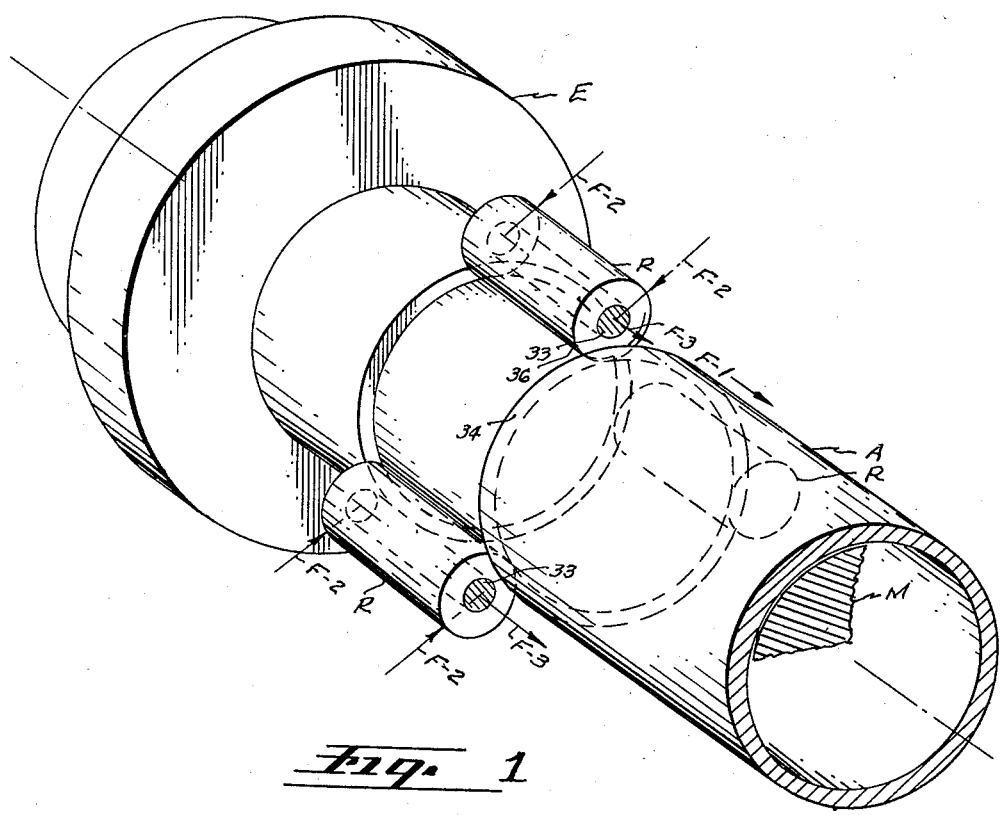
FIGURE 1 is a perspective view of an end portion of a metallic tube or pipe shown removably gripped on one end to be subjected to tensional loading as well as radial compression, cross rolling, and further tensional loading by a plurality of hard rollers that not only roll around the tubing but move longitudinally relative thereto.

Two stub mandrels 170 and 170' are placed in the end portions of tubing A, and split jaws 172 and 172' are caused to engage the exterior surfaces of the tubing above the stub mandrels. Jaws 172 and 172' are preferably formed with tapered exterior surfaces 174 and 174' that engage opposing tapered surfaces 176 and 176' formed on two housings 178 and 178'. When the spacing between housings 178 and 178' increases, the tension on tubing A increases, whereby the tubing can thus be deformed to the desired degree. The wall thickness of tubing A may be reduced substantially twenty percent without the use of a mandrel by subjecting it to a first method as illustrated in FIGURE 1 of the present application. This percentage varies somewhat, depending upon the physical structure of the particular metal or alloy of metals from which the tubing is fabricated. FIGURE 1 illustrates a length of tubing A positioned between two longitudinally separated gripping mechanisms 10 and which may be referred to generally by the letter E, and which may be of the structure shown in copending application entitled Method of Forming Close Tolerance Tubing and Apparatus for Use Therewith, filed March 7, 1960, under Serial No. 13,236, or in copending application entitled Tubing Gripping Mechanism, which issued as Patent No. 2,985,-455 on May 23, 1961, or copending application entitled Tube Gripping Mechanism, which issued as Patent No. 3,033,583 on May 8, 1962.

Longitudinal separation of the two gripping mechanisms E when supporting a length of tubing A therebetween, results in the exertion of a longitudinally applied stress force F-1 on tubing A. The magnitude of stress force F-1 is maintained constant during the tubing transforming operation by hydraulic or other means.

Three identical cylindrical rollers R are provided that are formed from a hard material such as one of the cemented carbides, such as tungsten carbide, tantalum carbide or titanium carbide. Rollers R are rotatably supported by shafts 33 that extend longitudinally therethrough as shown in FIGURE 1. Rollers R are held by a fixture (not shown) on spacings of 120° relative to one another, and are adapted to be moved radially toward the tubing A when it is desired to exert compressional loading thereon. After longitudinal tensioning of tubing A, the rollers R are moved toward the tubing to exert a radial second force F-2 thereon. The magnitude of force F-2 on each of the rollers is sufficient to sink each roller into the metal defining the tubing the desired depth to reduce the thickness of the wall thereof with one longitudinal pass of the rollers R thereover.

After tubing A has been tensioned by force F-1 and compressed by rotation of rollers R to exert a force F-2 thereon, the rollers R are concurrently with their rotation moved to the right (FIGURE 1) to exert a third longitudinally directed force F-3 on tubing A. Rollers R exert force against depressed surface areas 34 that are in pressure contact with the lowermost end surface areas 36 of the rollers. Depending upon the physical characteristics of the metal defining tubing A, the force F-1 is just below that magnitude at which plastic deformation of the tubing A starts. Thus, the force F-3 can be substantially less than force F-1 and range between 10% to a small fraction of 1% of the magnitude thereof. The advantage of this relationship between the forces F-1 and F-3 resides not only in the fact that it permits very close control of the total longitudinal strain to which tubing A is subjected, but that it permits use of lightweight, relatively inexpensive rollers R. Furthermore, the above described operation may, in many instances, be carried out without the use of a mandrel (not shown) inside tubing A.

After rollers R have traversed the length of tubing A to reduce the wall thickness thereof a desired amount and concurrently elongate the tubing, the rollers are sunk to a new depth in the material defining the tubing and caused to traverse the length thereof in the opposite direction. This process is continued until the wall thickness of the tubing A has been reduced the desired amount.

The following results were obtained when the above described method was carried out on stock tubing A formed of 304 stainless steel. Initially tubing A had an external diameter of 1¼″ and a wall thickness of .095″, and was subjected to the forming operation just described without the use of a mandrel. On the first pass of rollers R thereover, the wall thickness was reduced to .085″. A second pass of rollers R over the tubing in the reverse direction reduced the wall thickness to .080″. A third pass over tubing A by rollers R in the same direction as the first pass reduced the wall thickness to .075″. At this point, the internal diameter of tubing A was 1.06″, the same internal diameter as when the operation started. When it was attempted to further reduce the wall thickness to .070″ without the use of a mandrel the internal diameter of tubing A started to decrease.

Figure 8:
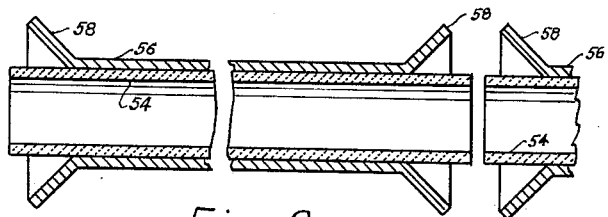
FIGURE 8 is a longitudinal cross-sectional view of a length of multi-ply tubing after removal thereof from the forming apparatus, the interiorly disposed tube of which is fabricated of glass or a ceramic, with the flared ends of the exteriorly disposed tubing used during the forming operation being used thereafter for connecting lengths of the multi-ply tubing in end-to-end relationship.

Tension on tubing A can also be achieved by using the method described in said application Serial No. 512,061, particularly as shown in FIGURE 4 thereof, which figure is reproduced as FIGURE 8 in the present application. In addition, the following results have been obtained when the process is carried out with an elongate cylindrical mandrel M disposed within the tubing A. In transverse cross section mandrel M is slightly smaller than that of the bore in the close tolerance tubing that is to be formed by the present process.

*Example No. 1*

[Material: 321 stainless steel seamless tubing having 1.800″ outside diameter and a wall thickness of .087″]

| Pass No.: | Wall Thickness at End of Pass, Inches |
|---|---|
| 1 | .065 |
| 2 | .055 |
| 3 | .045 |
| 4 | .035 |
| 5 | .025 |
| 6 | .020 |
| 7 | .016 |
| 8 | .012 |
| 9 | .010 |
| 10 | .008 |
| 11 | .005 |
| 12 | .004 |
| 13 | .003 |

*Example No. 2*

[Material: Zircaloy (zirconium) seamless tubing finished by Allegheny-Ludlum Steel Corporation having an outside diameter of 1.800′ and a wall thickness of .085″]

| Pass No.: | Wall Thickness at End of Pass, Inches |
|---|---|
| 1 | .070 |
| 2 | .060 |
| 3 | .050 |
| 4 | .040 |
| 5 | .030 |
| 6 | .025 |
| 7 | .017 |

It will be particularly noted that in the transformation of stock tubing A as above described, the metal defining the tubing is concurrently subjected to the two forces F-1 and F-3 first in one direction, and then in the opposite direction as the rollers R make a number of passes relative to the tubing. Concurrently with the application of these forces F-1 and F-3 the tubing is subjected to a number of circumferentially spaced areas of compression as the rollers R rotate in pressure contact with the exterior surface of tubing A, as shown in FIGURE 1. Thus, there is a variable relationship between the longitudinally applied forces F-1 and F-3 on the one hand, and the radially and transversely applied force F-2 on the other hand, which can be easily controlled to obtained a desired ratio therebetween.

The importance of having such a controllable ratio will be apparent from a consideration of the following factors. In the cold drawing of seamless tubing on a draw bench, it has been determined that when the wall thickness only is reduced, the structure of the drawn metal is identical to that of a rolled sheet. Also, it has been determined that when the wall thickness and circumference of the tubing are reduced equally, the texture of the drawn tube is that of a wire. A metal cold worked in a single direction should be strain hardened as to subsequently applied tensional loading in the direction in which the working took place. Such a cold worked material would have toughness and high tensile working in the direction of elongation, but could be brittle and relatively weak as to loading in a direction normal to the direction it is drawn. This disadvantage of tubing which is drawn in a single direction is eliminated in the methods hereinafter described. This disadvantage of tubing which is drawn in a single direction is eliminated by cold working the tubing in the manner shown in FIGURE 1.

Figure 12:
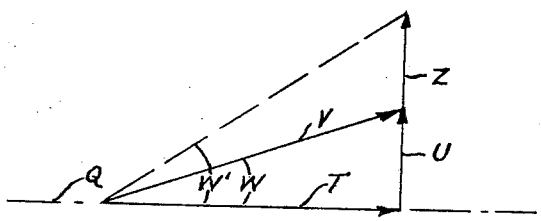

If the magnitude of the longitudinal stresses in the tubing A parallel to the center line Q thereof is represented by the length of a leg T of a force diagram as shown in FIGURE 12, and the transverse stresses in the tubing will be in the direction of the resultant V which constitutes the hypotenuse of the triangle. Leg T of the force triangle is represented by the sum of the forces F-1 and F-3. Leg U, of course, is proportional to the force F-2. The greater the force F-2, the deeper will be the depth to which rollers R are sunk into the metal of tubing A. The letter W in FIGURE 12 indicates the angle between the hypotenuse V relative to the longitudinal center line Q. This angle between hypotenuse V, which hypotenuse indicates the direction of maximum elongate stressing in tubing A and center line Q, may be increased or decreased by increasing or decreasing the magnitude of the force F-2 while maintaining the combined magnitude of forces F-1 and F-3 steady. Likewise, the angle W shown in the force diagram may be increased or decreased by increasing or decreasing the combined magnitude of the forces F-1 and F-3 while holding the force F-2 constant.

The transverse stress U shown in the force diagram is related to the radially applied force F-2 shown in FIGURE 1, inasmuch as the greater the force F-2, the greater the depth to which rollers R are sunk into the metal of tubing A. As the rollers R are caused to rotate circumferentially around tubing A, each roller must continuously compress a portion of the metal projecting upwardly along the lowermost surface area thereof.

The angle W between the center line Q of tubing A and the hypotenuse V may be increased by rotating one end portion of tubing A during the forming operation relative to the other end portion thereof, while maintaining the forces F-1, F-2 and F-3 constant. The additional stress imposed by rotation of one end of tubing A is indicated by a line Z in the force diagram of FIGURE 12. Due to the additional transverse stress Z, the hypotenuse V then occupies the position V', and the angle W is increased to W'. The angle W or W' of the resultant stress in tubing A relative to the center line Q thereof is important, for it is in the direction of hypotenuse V or V' wherein maximum cold working of the metal of the tubing has occurred. Inasmuch as it has been determined that maximum tensile strength metal that has been cold worked will lie in substantially the same plane as the direction of maximum elongation, the lines V and V' also indicate the direction of maximum tensile strength of tubing A. Metallic material that work-hardens when subjected to stresses of sufficient magnitude to permanently deform the material, initially has a grain structure of a first pattern, but after such deformation has a grain structure of a second pattern that is indicative of the direction or directions in which the deforming force or forces were applied thereto. An examination of the deformed work-hardenable material will therefore not only indicate the direction or directions of deformation, but also the direction in which the deformed and cold-worked material will have its maximum yield strength.

From experience, it is known that one can obtain steel having a high tensile strength as well as toughness in the direction of cold working, yet this same steel will be almost as brittle as cast iron relative to stresses imparted thereto transverse to the direction of rolling. Thus, by controlling the magnitude of the forces F-1 and F-3 relative to the transverse force F-2 and any additional transverse force obtained by rotating one end portion of the tubing relative to the other end thereof, the longitudinal and transverse strength of the metal can be controlled. Obviously, if the angle W or W' is 45°, the cold worked metal in tubing A should have equal strength and impact resistance both longitudinally and transversely. The term "cold working" as used in this application is to be interpreted as deforming the metal within a temperature range wherein work hardening of the metal occurs.

From the above description it will be seen that a first new article of manufacture can be produced, that is, close tolerance, thin-walled tubing. Due to cold working, the thin-walled tubing so formed is characterized by a portion thereof of maximum elongation which lies in a plane not parallel to the longitudinal axis of tubing A. Also, the thin-walled tubing so formed is further characterized, if desired, by a thinner wall thickness than that to which it has been possible to draw such tubing heretofore. The present method is particularly adapted for use in forming thin-walled tubing of metals or metal alloys which tend to gall when drawn, particularly zirconium and alloys thereof.

In the formation of tubing A to close tolerance tubing as shown in FIGURE 1, the forces F-1, F-2 and F-3 are controlled so that when the formed tubing is freed of these forces it will have sufficient elasticity to longitudinally contract and radially expand whereby the mandrel may be slidably removed therefrom. However, when it is desired to form multiply tubing, this control of the forces is reversed. The mandrel M is then replaced with thin-walled tubing 50, which may be fabricated from a metal such as titanium, zirconium, stainless steel that is resistant to a particular corrosive fluid which is to flow therethrough, or other metal having particularly advantageous corrosion and/or heat resistant properties. In general, such heat or chemical resistant metals or metal alloys are expensive, and it is therefore highly desirable that a minimum weight thereof be employed.

Figures 6, 7:
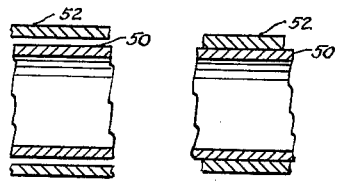
FIGURE 6 is a longitudinal cross-sectional view of portions of first and second tubes prior to being transformed into multi-ply tubing.
FIGURE 7 is a longitudinal cross-sectional view of multi-ply tubing after formation of the same.

The process of transforming stock tubing A as shown in FIGURE 1 is then repeated, but with the tubing 50 serving as the mandrel M, and a second length of tubing 52 of ordinary steel is subjected to forces F-1, F-2, and F-3. As the second tubing 52 is elongated and transversely contracts it is brought into pressure contact with the exterior surface of tubing 50. Tubing 52 is cold worked by the application of the forces F-1, F-2, and F-3 thereon, to the extent that it does not appreciably expand radially when these forces are released therefrom to move out of pressure contact with tubing 50. Due to pressure contact at the interfaces thereof, tubes 50 and 52 are frictionally engaged, and one tube cannot move longitudinally relative to the other as a result thereof. Tubes 50 and 52, when in such pressure and frictional engagement, are shown in FIGURE 7.

Another new article of manufacture is illustrated in FIGURE 8. A length of glass or ceramic tubing 54 is provided, and a tubing 56 of a metal or metal alloy envelops all but the end portions thereof. Tubing 56 has flared ends 58 to which the tensional force F-1 is applied during the forming operation. By application of the forces F-1, F-2 and F-3 thereto, tubing 56 is elongated and transversely contracted to bring it into pressure contact with the exterior of tubing 54. Tubing 56 is so stressed that when the forces F-1, F-2 and F-3 are released, the tubing 56 still remains in pressure and frictional contact with tubing 54. After completion of the above described operation the flared ends 58 are used to join lengths of the tubing in end-to-end relationship by means of couplings (not shown).

The article of manufacture just described is particularly useful when the fluid flowing through tubing 54 is of a corrosive nature. Although the material defining tubing 54 has been described as being glass or a ceramic, it will be obvious that the tubing can also be fabricated from one of the solid fluorocarbons such as Teflon manufactured by DuPont de Nemours of Wilmington, Delaware, a polymerized synthetic resin, hard rubber, or other metallic or non-metallic material having desired corrosion resistant, heat insulating, or heat resistant properties.

Figure 9:
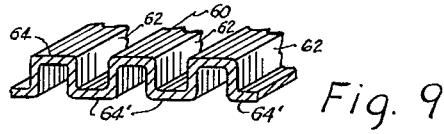
FIGURE 9 is a perspective view of a fragment of corrugated resilient sheet material.

Shown in FIGURE 9 is a fragment of a resilient sheet material indicated generally by the numeral 60. Structurally, sheet 60 comprises a number of parallel, laterally spaced side walls 62 that are alternately joined at the top and bottom thereof by webs 64 and 64' respectively. A rectangular section of sheet 60 is wrapped around the exterior surface of a metallic tube 66, with the side walls 62 being parallel to the longitudinal axis thereof. The longitudinal edges of the wrapped sheet 60 are in abutting contact. A second metallic tube 68 is placed in an enveloping position over sheet 60. The second tube 68 is then subjected to the forces F–1, F–2, and F–3 as shown in FIGURE 1 and described hereinabove, with the tube 68 being elongated and reduced transversely until it is in pressure contact with the sheet 60 as shown in FIGURE 10.

After tube 68 has been so deformed, the interior surface of this tube is in pressure contact with webs 64 and the exterior surface of tube 66 with webs 64'. The corrugated sheet 60 and tubing 66 and 68 cooperatively define a number of longitudinally extending passages 70 therebetween.

Figure 10:
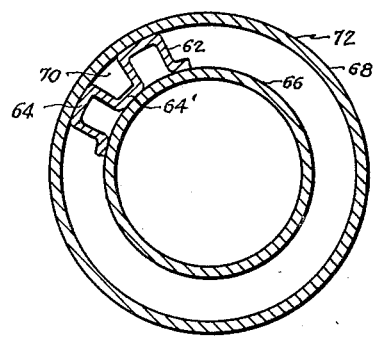
FIGURE 10 is a transverse cross-sectional view of a tubular product wherein the corrugated material is used to concentrically space a first tubular member from a second larger tubular member which is metallic that is circumferentially and longitudinally stressed.

This latter article of manufacture 72 which is illustrated in FIGURE 10, is susceptible of numerous and diverse industrial uses, such as providing a high efficiency, compact heat exchanger, insulated ducting, and the like. Furthermore, this article of manufacture embodies a novel feature in that it is free from welds, and the sheet 60 is held in the sandwiched tube-spacing position solely by the compressive force exerted thereon by tubing 68.

It will be obvious that the materials employed in the fabrication of the article of manufacture 72 will vary, depending upon the use to which it is to be put. For instance, if the article 72 is to be used as a heat exchanger to heat a liquid or gas flowing through the passages 70 by conduction of heat from a gas or liquid flowing through the tube 66, both the tube 66 and sheet 60 would be fabricated from a metal or alloy of metals having high heat transfer properties. Of course, if the liquid or gas in tube 66 is corrosive, the metal or metal alloy defining the same must be resistant relative thereto. Should the liquid in tube 66 be particularly corrosive, such as warm or hot brine carrying dissolved chlorine, the tube 66 could be replaced by the multi-ply tube shown in FIGURE 7 wherein the tube 50 was titanium and the tube 52 a steel or steel alloy.

When the article of manufacture 72 is to be used for hot air ducting in an airplane and it is desired to deliver a flow of hot air through the tube 66 to a source (not shown), the selection of materials from which sheet 60 and tube 66 is fabricated will be drastically changed from the example previously given. In hot air ducting or ducting adapted for handling hot gases, the material selected for tube 66 would be a heat and chemical resistant steel alloy, a material particularly adapted to withstand high temperatures, and corrosion resistant to the action of the gaseous material flowing therethrough, a fibre glass impregnated with a temperature resistant resin, or non-metallic materials that are particularly adapted to withstand both high temperatures and corrosive action. Although the material defining tube 66 must of necessity be resistant to heat and corrosion, it should in addition be as poor a heat conductor as possible. Likewise, the material defining sheet 60 should have as poor heat conducting properties as possible, for the less heat conducted by sheet 60 from tube 66 to tube 68, the less heat will be radiated therefrom.

When the article of manufacture 72 is being used to provide heat-insulated ducting, the transverse spacing between the side walls 62 of sheet 60 should be as great as possible to minimize the number of side walls 62 extending between tubes 66 and 68 to conduct heat. The air in passages 70 should also be evacuated therefrom to provide a vacuum which has excellent heat insulating properties. If a vacuum is to be used for heat insulation, the article of manufacture 72 may be formed as an endless loop (not shown) having a tubular inlet and outlet (not shown) in communication with the interior of tubing 66 only. Also, if the article 72 is to be used in lengths to provide a hot air or hot gas conducting duct, ring-shaped sealing members (not shown) would be inserted in the end portions of the annulus-shaped space between the tubes 66 and 68. In this latter construction the sheet 60 would terminate a short distance from both ends of each length of the article 72 shown in FIGURE 10.

The article of manufacture 72 can also be used to provide lightweight pressure vessels for holding low boiling point liquids such as butane, propane, and the like, as well as vessels in which extremely low boiling point liquids such as liquid oxygen, nitrogen, and the like, are maintained within tubing 66. In this last application, the vapor pressure of the low boiling point liquid in tube 66 is maintained at a minimum by the continuous circulation of an equally cold liquid through the passages 70.

The article of manufacture 72 (FIGURE 10) can also be employed as a tubular conduit to permit liquid discharge of low boiling point liquids from a storage space to another space remote therefrom where the low boiling point liquid is to be used. When the article 72 is so used, an equally cold liquid is disposed in the passages 70, with these passages being vented to the atmosphere to permit escape of the liquid material therethrough as a vapor during gradual transformation of the liquid material to gas due to heat absorption through the tube 68 from the ambient atmosphere.

Figure 11:
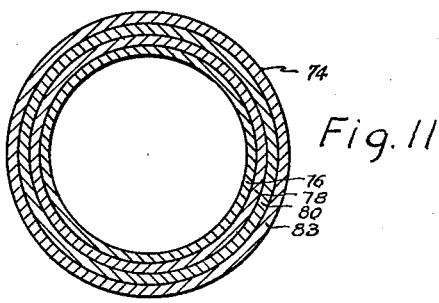
FIGURE 11 is a transverse cross-sectional view of a multi-ply tube particularly adapted for high pressure work; and, FIGURE 12 is a diagrammatic force diagram.

FIGURE 11 is a transverse cross section of a multi-ply tube or cylindrical shell that is identified generally by the numeral 74, and is another new and novel article of manufacture. Shell 74 is built up of a number of metal tubes 76, 78, 80 and 82 which are in pressure contact, and are so positioned by means of the method shown in FIGURE 1. The article of manufacture 74 is particularly adapted for use on extremely high pressure steam lines, as well as in the fabrication of thick-walled hydraulic cylinders such as are used in the extrusion of aluminum and various alloys thereof, and in autoclaves wherein various chemical reactions take place under high pressure. One advantage of the article 74 is that should there be a structural defect in one of the multiple tubes or plies defining the same, it will not seriously weaken the shell. However, a similar defect in a cast steel cylindrical shell will render it unfit for high pressure work. Also, by controlling the ratio between the forces F–1, F–2 and F–3, the tubes 76, 78, 80 and 83 can be given greater hoop strength than is possible with tubes drawn on a draw bench.

Figure 3:
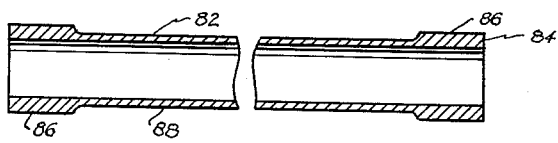
FIGURE 3 is a longitudinal cross-sectional view of a metallic seamless bellows blank having non-deformed tubular end sections.

Another new and novel article of manufacture 82 is shown in FIGURE 3, which is a tubular metallic blank utilized in forming seamless bellows. The article of manufacture 82 is formed by subjecting a stock metallic tube 84 to the operation illustrated in FIGURE 1. All but the end portions of tube 84 are subjected to this operation. The two end portions 86 of article 82 are sections of the stock tube 84 substantially the same condition and configuration as before the present forming operation was performed thereon. However, the tubular portion 88 extending between the end portions 86 and integrally formed therewith, has by use of the method shown and described in connection with FIGURE 1, been cold worked to a wall thickness of less than that to which is is possible to draw tube 84.

The tubular blank 82 is employed to form a seamless bellows by disposing the portion 88 thereof within the confines of a split forming die, an interior section 90 of which is shown in FIGURE 4. The interior surface of the die (not shown) is corrugated and defines the exterior shape to which it is desired to form the tubular portion 88. The end portions 86 of the blank are then connected to a source of hydraulic fluid under pressure and the pressure of this fluid is allowed to expand the tubular portion 88. FIGURE 4 shows a wall section of tubular portion 88 disposed adjacent an interior section 91 of the die prior to subjecting the portion 88 to hydraulic pressure.

Figure 5:
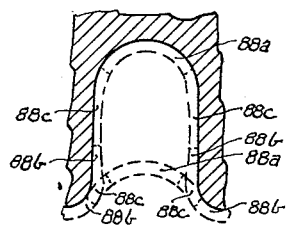
FIGURE 5 is an enlarged diagrammatic view of a portion of a wall section of said blank as the same is hydraulically deformed into a bellows-shaped configuration.

FIGURE 5 illustrates the manner in which a section of the tube portion 88 will be deformed radially into a transversely circular recess 92 formed between two adjacent corrugations 94 and 96 formed on the interior of the die (not shown). It will be particularly noted in FIGURE 5 that a first part 88a and two longitudinally spaced parts 88b of tube portion 88 will be initially subjected almost exclusively to radially directed forces. During the initial formation of tube portion 88 (FIGURE 5) into a bellows configuration, the parts 88c of the wall section situated between the part 88a and two parts 88b are subjected almost exclusively to stresses in a direction normal relative to the longitudinal axis of tube portion 88. These normally directed stresses are sufficient to cause plastic deformation and strain hardening of the parts 88c. As the parts 88c strain harden, they resist further elongation, and cause plastic deformation of the parts 88a and 88b until they too, have strain hardened to the same extent as the parts 88c.

Thus, by the time the part 88a has moved outwardly the maximum distance possible in the die 90 as shown in phantom line from the first position shown in phantom line in FIGURE 5, it has increased in length considerably as have the parts 88b and 88c. The parts 88a, 88b and 88c have all been stressed substantially the same, and the bellows is accordingly of substantially uniform strength throughout.

A further article of manufacture that can be formed by means of the process shown in FIGURE 1 is to substitute a core of wood (not shown) or a cylindrical mass of parallel electrical conductors individually wrapped with a compressible electrical insulation (not shown) for the tube 50 illustrated in FIGURE 7, and then deform the tube 52 thereover in exactly the same manner that it was deformed into pressure contact tube 50. The result when a core of wood is used, is to provide a structural and architectural element of high strength, and one in which the wood is maintained free from deterioration due to weathering, or lack of a protective surface. When electrical conductors are so sheathed, a structural element is provided that is of high strength, and one in which the insulated conductors are protected.

If two dissimilar metals are used to define the tubes 50 and 52 shown in FIGURE 7, the resulting article of manufacturing can be employed as a thermocouple, if desired. An example of two different metal alloys that could be utilized for tubes 50 and 52 are sold under the trade-marks Chromel and Alumel. Chromel is composed of 90% nickel and 10% chromium. Alumel comprises the composition of 94% nickel, 2% aluminum, 3% manganese, and 1% silicon. The thermocouple tubular member formed by the present process preferably has the circumferential edge portions hermetically sealed by a pressure rolling operation normal to the longitudinal axis thereof.

It will be obvious to those skilled in the art that various changes may be made in the invention without departing from the spirit and scope thereof, and therefore the invention is not limited by that which is shown in the drawings and described in the specification, but only as defined in the appended claims.

I claim:

1. A new article of manufacture comprising a one-piece tubular body having relatively thick-walled end portions, with a thinner-walled portion situated therebetween, which body is formed of a grain-structured metallic material that increases in tensile strength in a direction in which a tensioning force is applied thereto to permanently deform said body, with the grain structure of said thinner-walled portion being disposed and permanently deformed in a direction other than parallel to the longitudinal axis of said tubular body, and the maximum tensile strength of said thinner-walled portion being in a direction substantially parallel to the direction of said grain structure thereof.

2. An article of manufacture as defined in claim 1 in which said thinner-walled portion is thin and foil-like in structure.

3. An article of manufacture as defined in claim 2 in which a plurality of longitudinally spaced, circumferentially extending convolutions are formed in said thinner-walled portion.

4. An article of manufacture as defined in claim 1 in which said two end portions taper outwardly in opposite directions from said thinner-walled portion.

References Cited in the file of this patent

UNITED STATES PATENTS

| | | |
|---|---|---|
| 798,055 | Nicholson | Aug. 22, 1905 |
| 2,013,193 | Stadtfeld | Sept. 3, 1935 |
| 2,336,397 | Harrington | Dec. 7, 1943 |
| 2,377,177 | Pfleumer | May 29, 1945 |
| 2,516,689 | France et al. | July 25, 1950 |
| 2,610,304 | Garner | Sept. 9, 1952 |
| 2,805,972 | Cross et al. | Sept. 10, 1957 |
| 2,965,961 | Schindler et al. | Dec. 27, 1960 |
| 3,009,484 | Dollens | Nov. 21, 1961 |